May 16, 1950 S. GILBERT 2,507,780
METHOD OF ATTACHING CONDUCTORS TO CARBON BRUSHES
Filed Sept. 29, 1947
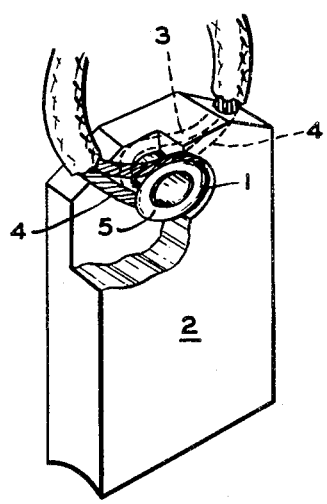
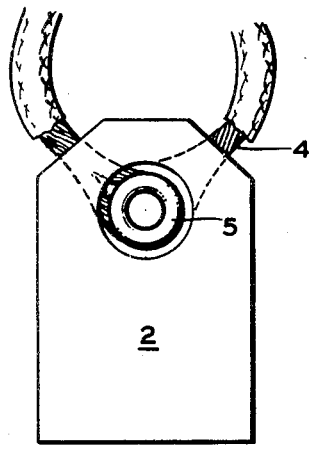
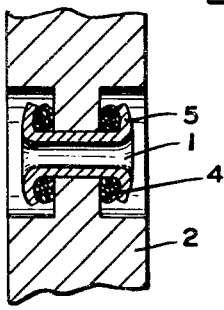
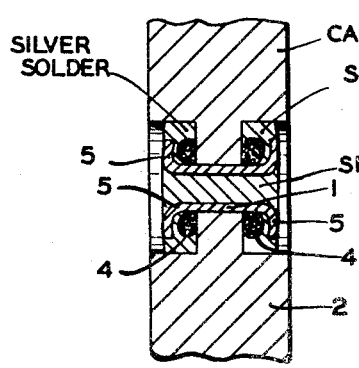
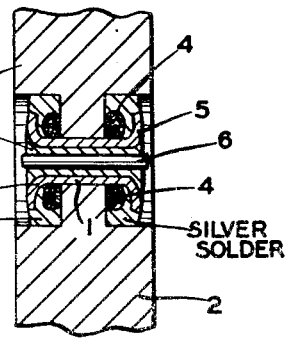
INVENTOR
SAMUEL GILBERT
BY
ATTORNEY Patented May 16, 1950

2,507,780

UNITED STATES PATENT OFFICE 2,507,780

METHOD OF ATTACHING CONDUCTORS TO CARBON BRUSHES

Samuel Gilbert, Cedar Grove, N. J., assignor to Bendix Aviation Corporation, Teterboro, N. J., a corporation of Delaware Application September 29, 1947, Serial No. 776,736

7 Claims. (Cl. 29—155.55)

The present application relates to a carbon brush and a method of fastening an electrical conductor thereto.

Heretofore, conductors have been attached to electrical carbon brushes by riveting. It has been found, however, that in high output equipment high current flow and resulting high temperatures cause the riveted conductors to loosen in the brushes due to the elongation and expansion of the rivet, causing consequent increased current drop at the brush connection and overload failure of remaining brushes in the equipment.

An object of the present invention is to provide a novel method for eliminating such failures without damage to the electrical properties of the brush or adversely affecting brush life.

Another object of the invention is to provide a novel method of fastening a conductor to a brush so that continuous electrical contact is maintained between the brush and conductor in the rivet area and loosening in service is eliminated.

Another object of the invention is to provide a novel method of fastening a conductor to a brush by means of a hollow shell rivet inserted in an opening in the brush; wrapping the conductor about the outer diameter of the rivet; and filling the rivet shell and the space between the rivet and brush with an electrical conducting bonding metal so as to form a solid rivet with the conductor bonded thereto and a continuous electrical contact in the rivet area between the conductor and brush.

The above and other objects and features of the invention will appear more fully hereinafter from a consideration of the following description taken in connection with the accompanying drawing wherein two embodiments of the invention are illustrated by way of example.

In the drawing:

Figure 1 is a perspective view of a conventional carbon brush with certain parts broken so as to illustrate the rivet connection.

Figure 2 is an enlarged fragmentary sectional view of the connection of Figure 1.

Figure 3 is a side view of the brush of Figure 1 after application thereto of the herein described novel bonding method.

Figure 4 is an enlarged fragmentary sectional view of the connection of Figure 3.

Figure 5 is an enlarged fragmentary sectional view of a connection made in accordance with a modified form of the method.

Referring to the drawing of Figure 1, there is shown thereby the conventional practice in fastening conductors to a carbon brush by inserting a copper rivet 1 in an opening formed in a brush 2 and in a looped portion 3 of a conductor of pig tail 4.

The rivet 1 then has its opposite ends 5 turned down by a conventional riveting machine so as to fasten the conductor 4 and rivet 1 in the brush 2.

However, it has been found that in high output equipment overheating of the brush readily occurs causing elongation of the rivet 1 and consequent loosening of the connection between the conductor 4 and brush 2 at the turned ends 5.

In the present invention after the conductor 4 and rivet 1 have been fastened to the brush as shown in Figure 1 a suitable solder flux is applied to rivet 1 and to the looped portion 3 of conductor 4. The brush 2 with the hollow rivet 1 is then dipped into a molten silver solder kept at a temperature of about 1300 degrees Fahrenheit.

The brush is left in the molten silver solder until the solder takes hold of the rivet 1 and looped portion 3 of the conductor 4, or for a period of about two minutes, after which the brush 2 is removed and subjected to room temperature. It will be found that the silver takes hold at the rivet 1 and the looped portion 3 of the conductor 4 to which there has been applied solder flux. The silver solder will fall away from that portion of the brush 2 to which no flux has been applied, upon removal of the brush from the molten silver solder.

During the immersion of the brush in the molten silver solder the high temperature of the solder will cause rivet 1 to expand and elongate so as to increase the interior of the hollow rivet 2 and the space between the turned over ends 5 of the rivet 1 and the brush. The interior of the hollow rivet 1 will then be filled by the silver solder as will the space between the turned over ends of the rivet 1 and the looped portions of the conductor 3, as best shown in Figure 4.

Upon removal of the brush 2 from the molten metal the same is cooled to room temperature causing the rivet 1 to contract in cooling so as to increase the pressure between the turned ends 5 of the rivet 1, conductor portion 3, and the brush 2. Moreover the filling of the hollow interior of the rivet 1 with the molten metal when in the radially expanded condition tends to limit radial contraction of the rivet 1. Thus upon cooling to room temperature the rivet 1 is formed into a solid rivet securely held in the brush and forming a continuous electrical contact between the conductor 4 and brush 2. Moreover the molten metal fills the space between the rivet 1 and brush 2 so that upon the metal solidifying, loosening of the rivet 1 or conductor 4 is prevented.

As an alternative method, instead of immersing the brush in molten silver solder, the silver solder may be applied to the rivet by brazing by induction heating. Thus a disc of silver solder may be placed at opposite ends of the rivet 1 and then by spot welding or induction brazing the same may be heated to a temperature sufficiently high as to cause the silver solder to flow through the hollow rivet 1 in a molten state, cause expansion of the rivet 1 and the effect previously noted. The brush may then be permitted to cool so that rivet 1 is formed into a solid rivet as shown in Figure 3.

The brush of Figure 3 which has been subjected to the foregoing silver solder process shows in service much longer life and remarkably cooler brush temperatures than brushes embodying only the rivet connection of Figure 1.

In Figure 5 there is illustrated a modified form of the invention in which a copper wire 6 is inserted in the opening of the rivet 1 before subjecting the same to the silver solder process so as to decrease the amount of silver solder required. The process is otherwise the same as described with reference to Figures 3 and 4.

It is believed that from the foregoing the advantages of the applicant's novel process in securing conductors to carbon brushes for high output equipment will be readily apparent.

While several embodiments of the invention have been illustrated and described, various changes in the form and relative arrangements of the parts may be made to suit requirements.

What is claimed is:

1. The method of attaching an electrical conductor to a carbon brush having a conductor receiving cavity, which comprises placing a looped end of the conductor in the cavity; inserting a hollow copper rivet in the cavity so as to interlink the looped end of the conductor and rivet; turning opposite ends of the rivet down to secure the same in position; applying a solder flux to the looped end of the conductor and to the rivet; immersing the carbon brush in molten silver solder held at a temperature of about 1300 degrees Fahrenheit for a period of about two minutes so as to cause elongation of the rivet at its opposite turned down ends, expansion of the hollow rivet, and the filling of the expanded hollow rivet with the molten silver solder; removing the carbon brush from the molten silver solder and cooling the same so as to permit molten silver solder to solidify within the hollow rivet, between the elongated turned down ends of the rivet and the looped end of the conductor, and between the conductor and brush so as to form the same into a solid mass and provide a continuous electrical contact between the conductor and brush.

2. The method defined by claim 1 including the step of inserting a copper wire into the hollow rivet before immersing the carbon brush in the molten silver solder so as to decrease the amount of silver solder used in the process.

3. The method of attaching an electrical conductor to a carbon brush having a conductor receiving cavity, which comprises placing an end of the conductor in the cavity; inserting a hollow copper rivet in the cavity so as to interlink the end of the conductor and copper rivet; turning opposite ends of the copper rivet down to secure the same in position; placing the carbon brush in molten silver solder held at a temperature sufficiently great to effect elongation of the copper rivet at its opposite turned down ends and effect expansion of the hollow copper rivet within the carbon brush; removing the carbon brush from the molten silver solder and cooling the same so as to permit molten silver solder to solidify within the hollow copper rivet, between the elongated turned down ends of the copper rivet and the end of the conductor, and between the conductor and brush so as to form the same into a solid mass and provide a continuous electrical contact between the conductor and brush.

4. The method of attaching an electrical conductor to a carbon brush having a conductor receiving cavity, which comprises placing an end of the conductor in the cavity; inserting a hollow copper rivet in the cavity so as to interlink the end of the conductor and copper rivet, turning opposite ends of the copper rivet down to secure the same in position; applying molten silver solder to the hollow copper rivet at a temperature sufficiently great to effect elongation of the copper rivet at its opposite turned down ends and effect expansion of the hollow copper rivet within the carbon brush; and permitting the molten silver solder to solidify within the hollow copper rivet between the elongated turned down ends of the copper rivet and the end of the conductor, and between the conductor and brush so as to form the same into a solid mass and provide a continuous electrical contact between the conductor and brush.

5. The method of attaching an electrical conductor to a carbon brush having a conductor receiving cavity, which comprises placing an end of the conductor in the cavity; inserting a hollow anchor element of a material having a relatively high electrical conductivity and melting point in the cavity so as to interlink the end of the conductor and anchor element; turning opposite ends of the anchor element down to secure the same in position; applying a molten metal having a relatively low melting point and high electrical conductivity to the hollow anchor element at a temperature sufficiently great to effect elongation of the anchor element at its opposite turned down ends and effect expansion of the hollow anchor element within the carbon brush; and permitting the molten metal to solidify within the hollow anchor element, between the elongated turned down ends of the anchor element and the end of the conductor, and between the conductor and brush so as to form the same into a solid mass and provide a continuous electrical contact between the conductor and brush.

6. The method of attaching an electrical conductor to a carbon brush having a conductor receiving cavity, which comprises placing a looped end of the conductor in the cavity; inserting a hollow copper rivet in the cavity so as to interlink the looped end of the conductor and rivet; turning opposite ends of the rivet down to secure the same in position; placing a disc of silver solder at opposite ends of the hollow rivet, heating the rivet and solder discs to a temperature sufficiently high as to cause the silver solder to flow through the hollow rivet in a molten state, cause elongation of the rivet at its opposite turned down ends, expansion of the hollow rivet, and the filling of the expanded hollow rivet with the molten silver solder; removing the carbon brush from the molten silver solder and cooling the same so as to permit the molten silver solder to solidify within the hollow rivet, between the elongated turned down ends of the rivet and the looped end of the conductor, and between the conductor and brush so as to form the same into a solid mass and provide a continuous electrical contact between the conductor and brush.

7. The method defined by claim 6 including the step of inserting a copper wire into the hollow rivet before applying the molten silver solder to the hollow rivet so as to decrease the amount of silver solder required in the process.

SAMUEL GILBERT.

REFERENCES CITED

The following references are of record in the file of this patent:

UNITED STATES PATENTS

| Number | Name | Date |
| --- | --- | --- |
| 1,979,696 | Lynn | Nov. 6, 1934 |
| 2,338,409 | Conradty | Jan. 4, 1944 |
| 2,429,847 | Settle | Oct. 28, 1947 |
| 2,438,959 | Bartelheim | Apr. 6, 1948 |